(12) United States Patent
Iinuma et al.

(10) Patent No.: US 8,462,474 B2
(45) Date of Patent: Jun. 11, 2013

(54) RECLOSING SYSTEM FOR POWER TRANSMISSION LINE

(75) Inventors: Shigeo Iinuma, Misato (JP); Masao Hori, Kawasaki (JP); Satoshi Shinsyou, Kawaguchi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 13/051,006

(22) Filed: Mar. 18, 2011

(65) Prior Publication Data

US 2011/0170220 A1 Jul. 14, 2011

Related U.S. Application Data

(63) Continuation of application No. PCT/JP2009/065873, filed on Sep. 10, 2009.

(30) Foreign Application Priority Data

Sep. 18, 2008 (JP) .................................. 2008-239680

(51) Int. Cl.
*H02H 7/00* (2006.01)

(52) U.S. Cl.
USPC .......................................................... 361/61

(58) Field of Classification Search
USPC .......................................................... 361/61
See application file for complete search history.

(56) References Cited

U.S. PATENT DOCUMENTS

| | | | |
|---|---|---|---|
| 3,532,935 A | 10/1970 | Waldron | |
| 3,704,392 A | 11/1972 | Chen et al. | |
| RE28,490 E * | 7/1975 | Chen et al. | 361/71 |
| 4,398,232 A * | 8/1983 | Elmore | 361/47 |
| 4,538,197 A * | 8/1985 | Breen | 361/71 |
| 6,504,693 B1 * | 1/2003 | Moffat et al. | 361/62 |
| 6,768,620 B2 * | 7/2004 | Kim et al. | 361/59 |
| 6,873,508 B2 * | 3/2005 | Kase et al. | 361/80 |
| 7,075,764 B2 * | 7/2006 | Wahlroos et al. | 361/63 |
| 2002/0080539 A1 * | 6/2002 | McClure et al. | 361/59 |
| 2003/0039086 A1 * | 2/2003 | Kase et al. | 361/65 |
| 2004/0027747 A1 * | 2/2004 | Kim et al. | 361/59 |
| 2004/0130835 A1 * | 7/2004 | Wahlroos et al. | 361/2 |
| 2006/0276979 A1 * | 12/2006 | Price | 702/59 |
| 2011/0170220 A1 * | 7/2011 | Iinuma et al. | 361/71 |

FOREIGN PATENT DOCUMENTS

| | | |
|---|---|---|
| JP | 57-135617 A | 8/1982 |
| JP | 4-168908 A | 6/1992 |
| JP | 2004-64957 A | 2/2004 |
| JP | 3710771 | 10/2005 |
| JP | 2008-259327 | 10/2008 |

OTHER PUBLICATIONS

International Search Report issued Dec. 1, 2009 for Japanese Patent Application No. PCT/JP2009/065873.

(Continued)

*Primary Examiner* — Ronald W Leja
(74) *Attorney, Agent, or Firm* — Oblon, Spivak, McClelland, Maier & Neustadt, L.L.P.

(57) ABSTRACT

There is provided a reclosing system for a power transmission line, which performs high-speed reclosing using protection relays. The protection relays are provided at different terminals of the power transmission line. Each of the protection relays is configured to send the reclosing command to the circuit breaker when a line voltage at the phase with the accident, detected by the metering voltage transformer after the phase with the accident is cut off, falls within an allowable range. The allowable range is determined based on a line voltage assumed at the phase when the phase is normal.

18 Claims, 16 Drawing Sheets

OTHER PUBLICATIONS

International Written Opinion issued Dec. 1, 2009 for Japanese Patent Application No. PCT/JP2009/065873.

Chinese Office Action mailed Mar. 13, 2013 in Chinese Patent Applicatin 200980136520.2 with English translation.

* cited by examiner

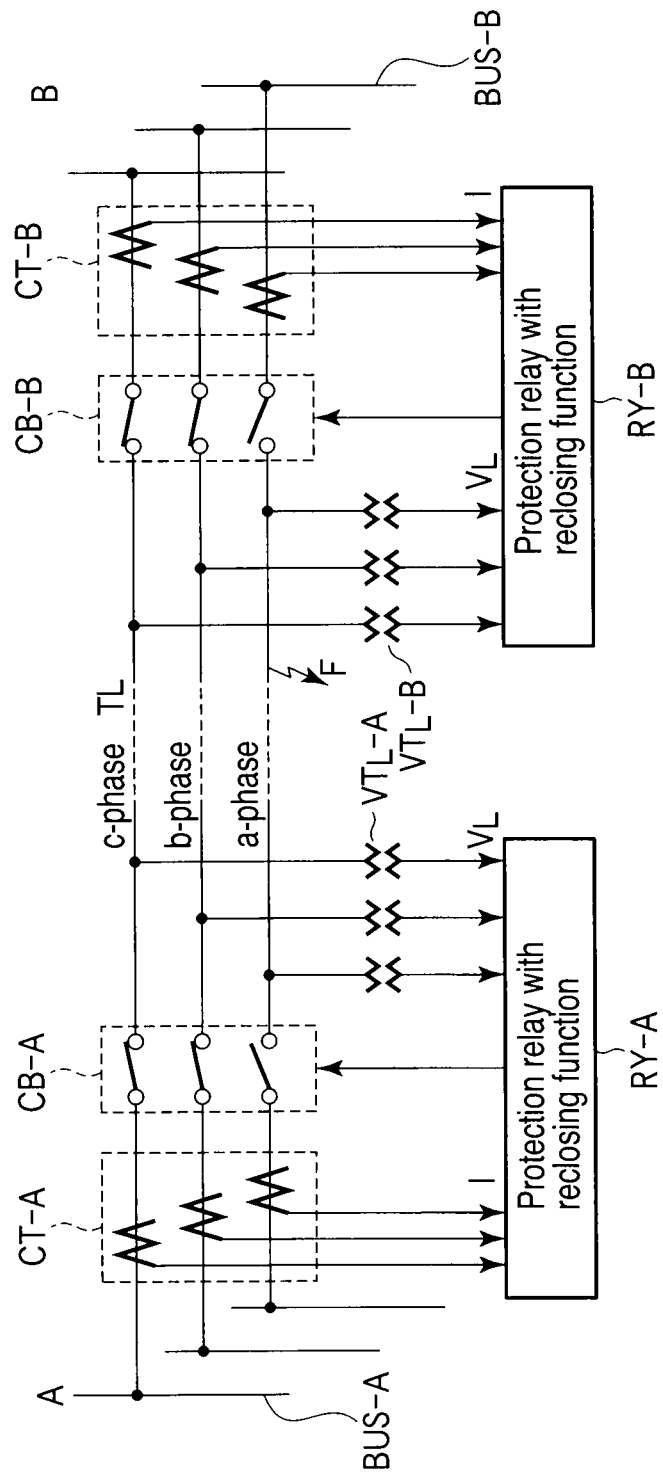
F I G. 1

$j\omega Cm(Vb-Va)+j\omega Cm(Vc-Va)=j\omega CsVa$ $\therefore Va = \dfrac{Cm}{(2Cm+Cs)}(Vb+Vc)$ (a) Electrostatic coupling voltage (when a-phase is cut off)

$Va = j\omega M(Ib+Ic)$ (b) Electromagnetic coupling voltage (when a-phase is cut off)

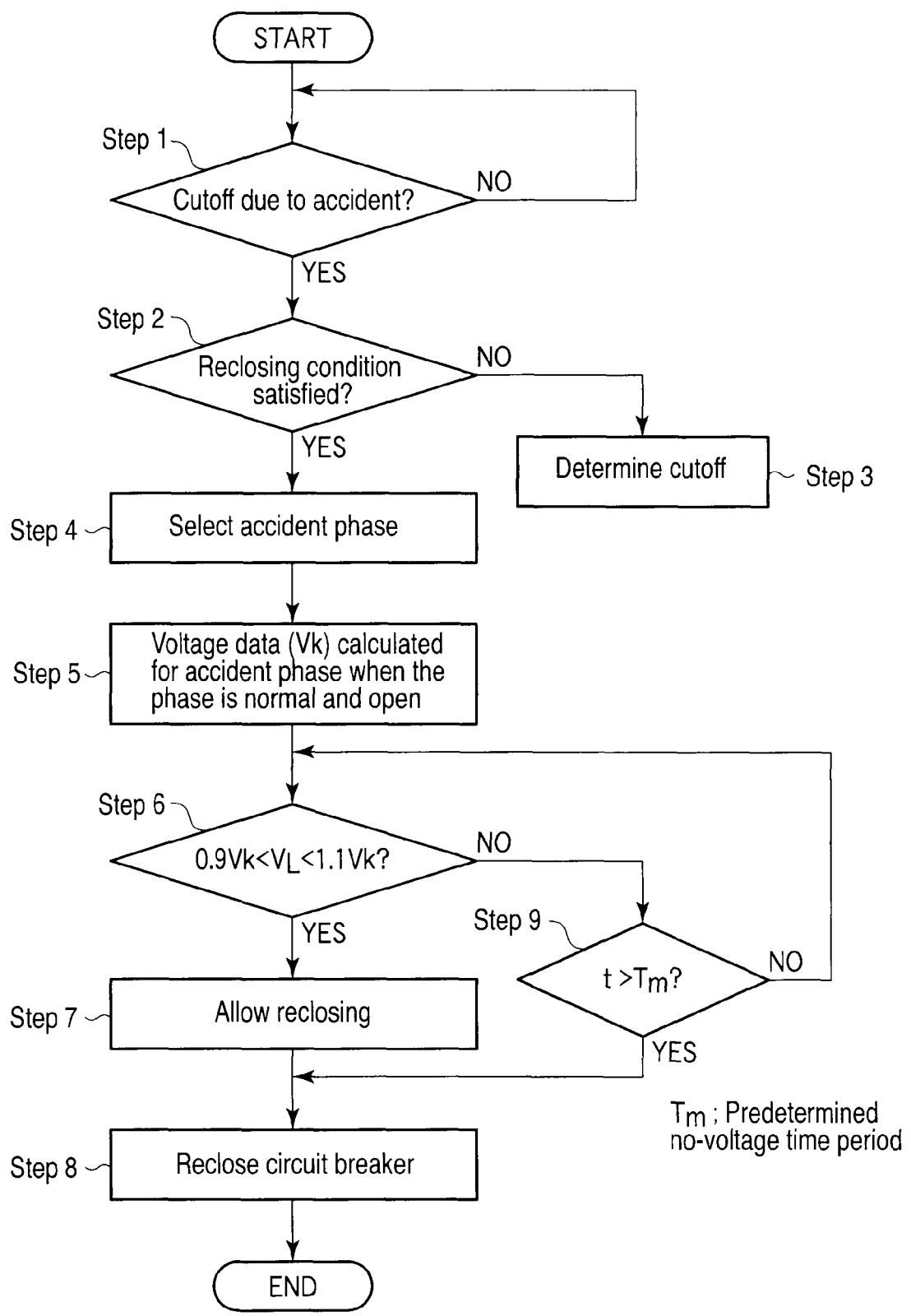
F I G. 14

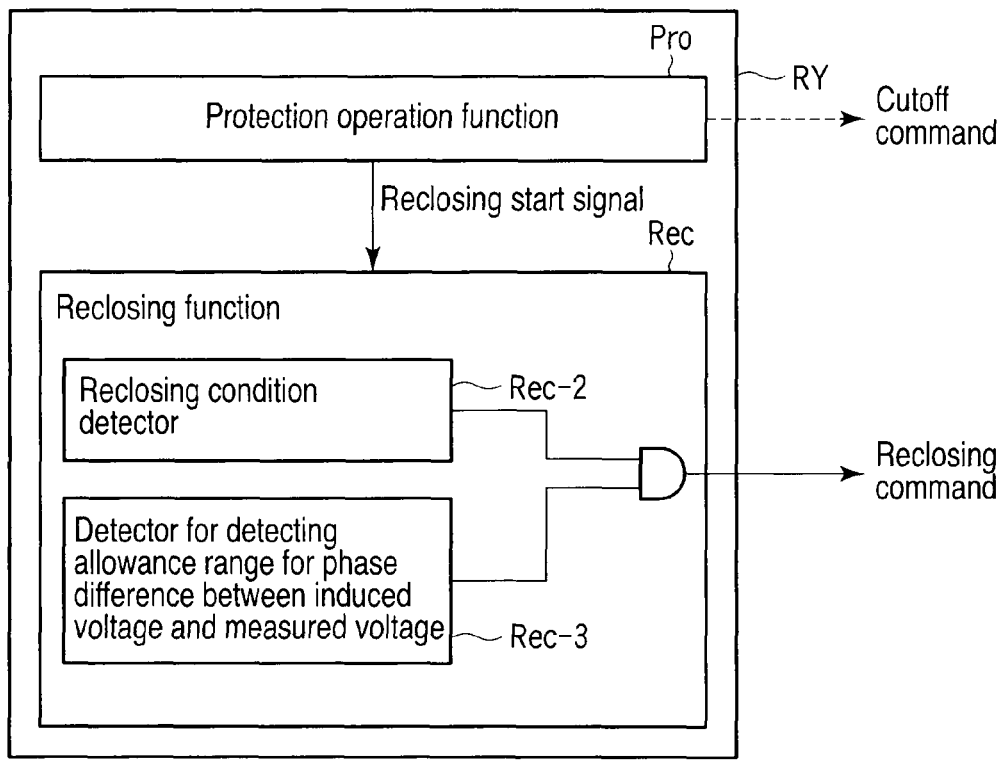
F I G. 15
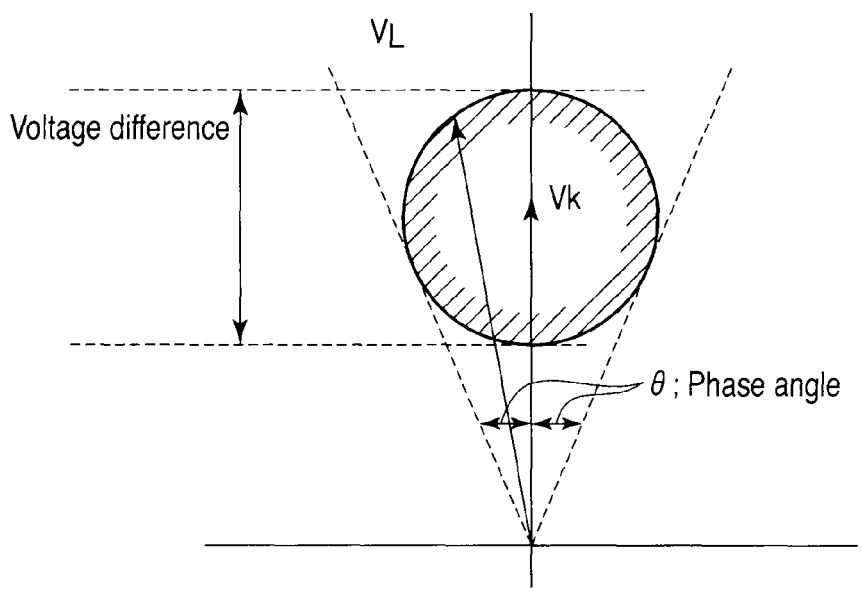
F I G. 16

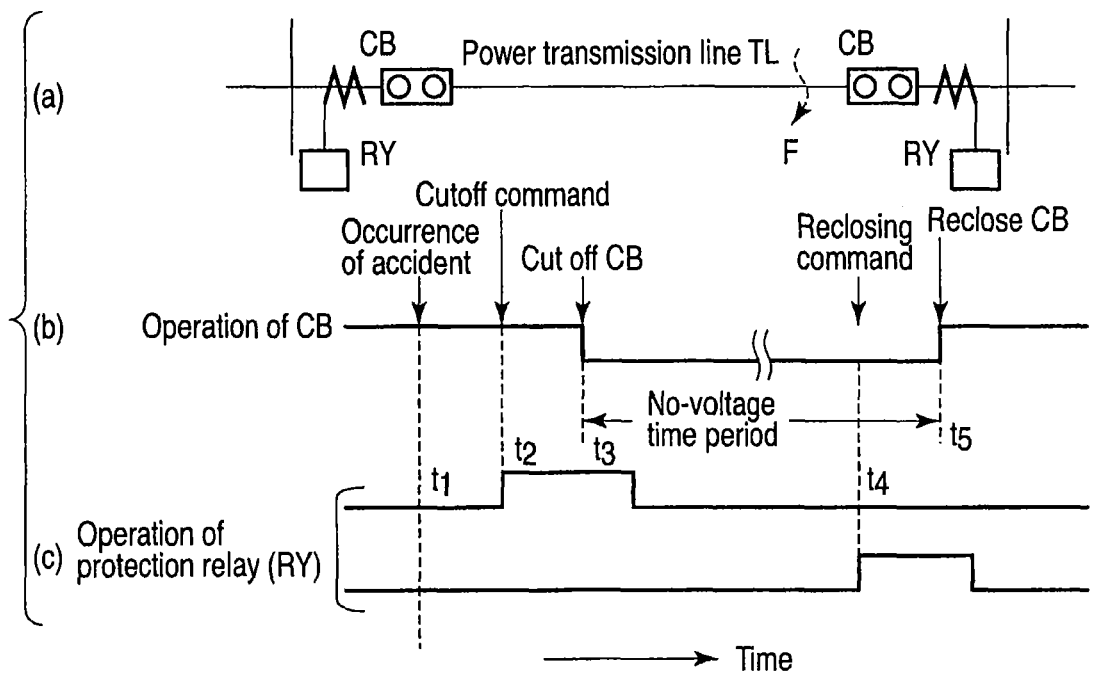
PRIOR ART  FIG. 19
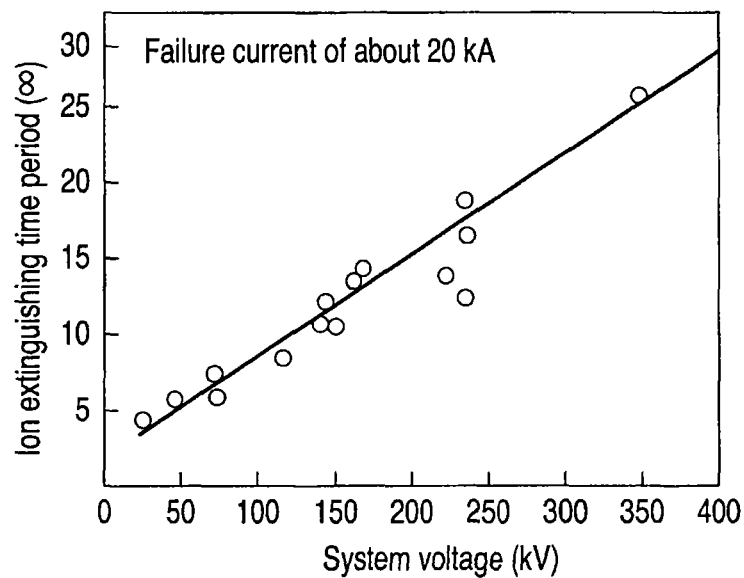
PRIOR ART  FIG. 20

RECLOSING SYSTEM FOR POWER TRANSMISSION LINE

CROSS REFERENCE TO RELATED APPLICATIONS

This is a Continuation Application of PCT Application No. PCT/JP2009/065873, filed Sep. 10, 2009, which was published under PCT Article 21(2) in Japanese.

This application is based upon and claims the benefit of priority from prior Japanese Patent Application No. 2008-239680, filed Sep. 18, 2008, the entire contents of which are incorporated herein by reference.

BACKGROUND OF THE INVENTION

1. Field of the Invention

The present invention relates to a reclosing system for a power transmission line, in which the arc ion extinguishing time of an accident phase is detected by a simple method to execute reclosing.

2. Description of the Related Art

There is a reclosing system of a direct grounding type for power transmission lines. As the reclosing system of this type, a single-phase reclosing system in which when there is one accident phase, only the accident phase is opened and reclosed, or a three-phase reclosing system in which when there are two accident phases, three phases are opened and reclosed, is employed. Further, there is a parallel-type double-line reclosing system. As the parallel double-line reclosing system, a multiphase reclosing system, in which an accident phase is opened, and is reclosed if two or three normal phases are still left, is employed for stable operation.

In general, the time ranging from the opening of a circuit breaker to its reclosing is called a no-voltage time period. The no-voltage time period is determined based on a supposed time period ranging from the cutoff of an accident current by the circuit breaker, to the arc-ion extinguished time point at the place of the accident. The no-voltage time period varies depending upon the state of the accident. In the single-phase and multiphase reclosing systems, the no-voltage time period is set to about 1 sec, while in the three-phase reclosing system, it is set to about 0.5 to 0.8 sec.

FIG. 19 is a time chart illustrating the operation performed from the opening of a circuit breaker CB by a transmission line protection relay RY to the reclosing of the breaker by the relay after a no-voltage time elapses, when an accident F due to, for example, ground discharge occurs in a single-line power transmission line TL. (a), (b) and (c) of FIG. 19 show the operation of a power system, the response of the circuit breaker CB, and the response of the protection relay RY, respectively.

As shown in (a), (b) and (c) of FIG. 19, the accident F occurs at time point t1 due to, for example, ground discharge, an accident current flows into the transmission line protection relay RY to operate the same, the relay RY outputs a cutoff command to the circuit breaker CB at time point t2, and the circuit breaker CB is opened at time point t3 to extinguish the accident current.

At the place of the accident F, the ambient air is ionized by arc discharge. If power transmission is resumed before arc ions are diffused and extinguished, arc current again flows and reclosing fails. In view of this, time point t4 (<t5) at which a reclosing command is issued is set so that the circuit breaker CB is reclosed at time point t5 assumed after a time period within which the arc ions are generally supposed to be completely extinguished elapses.

The time period (ion extinguishing time period) required until the arc ions are extinguished after the accident current is cut off varies depending upon primary arc current, system voltage, line constant length (on which line distributed capacity depends), wind velocity, etc. At any rate, it is necessary to set the no-voltage time period up to reclosing slightly longer than the ion extinguishing time period.

In general, the dielectric recovery time period and the ion extinguishing time period are longer as the accident current is greater and in proportion to the system voltage. The no-voltage time period for reclosing is set to about 1.0 sec. in the case of a 500 kV system, and to about 0.5 to 0.8 sec. in the case of a 187 to 275 kV system.

FIG. 20 is a graph showing the relationship between the nominal voltage and the time period required for ion extinguishing after cutoff due to an accident, which is assumed where the accident current is about 20 kA. At the accident place F, the air is ionized by arc discharge, and residual ions are left even after the accident current is cut off. The time period within which the residual ions are extinguished, i.e., the ion extinguishing time period, is deeply associated with the system voltage. Namely, the higher the system voltage, the longer the ion extinguishing time period.

For the power system, the no-voltage time period for reclosing significantly influences its stability. Therefore, it is preferable to minimize the no-voltage time period. To this end, Japanese Patent No. 3710771, for example, has proposed a technique of detecting the time when the ratio of harmonics in the line voltage of an accident cutoff phase is reduced (this time period corresponding to the arc-ion extinguishing time period), and adaptively (freely) changing the no-voltage time period based on the detection result.

BRIEF SUMMARY OF THE INVENTION

In the proposed technique, it is necessary to detect line voltage changes ranging from substantially 0 V at the time of occurrence of an accident to the voltage resulting from the induction caused after extinguishing of the arc ions. Namely, an extremely high detection accuracy is required. In particular, since the voltage assumed before the arc ions are extinguished, i.e., a line voltage at a corresponding terminal, significantly differs depending upon the position of an accident on the power transmission line, highly accurate voltage detection must be performed.

If the arc ion extinguishing time can be detected and a reclosing command is issued at the detection time period, occurrence of an accident during reclosing can be avoided and hence the system is much stabilized. However, as described above, highly accurate voltage detection is required to detect the arc ion extinguishing time. Because of this, it is difficult at present to put to practice the method disclosed in the above-mentioned publication.

Accordingly, it is an object of the present invention to provide a reclosing system for power transmission lines, which does not require so high line voltage detection accuracy, can easily detect the arc ion extinguishing time of an accident phase, and can prevent occurrence of an accident during reclosing.

According to one aspect of the present invention, there is provided a reclosing system for a power transmission line, which performs high-speed reclosing using protection relays, the protection relays being provided at different terminals of the power transmission line, each of the protection relays comprising a protection calculation function and a reclosing function, the protection calculation function being configured to receive voltage signals detected by a metering voltage transformer and current signals detected by a metering current transformer to execute a predetermined protection calculation to thereby cut off a phase with an accident on the power transmission line, the reclosing function being configured to output a reclosing command to a circuit breaker when the phase with the accident becomes to satisfy a reclosing condition, wherein each of the protection relays comprises means for sending the reclosing command to the circuit breaker when a line voltage at the phase with the accident, detected by the metering voltage transformer after the phase with the accident is cut off, falls within an allowable range, the allowable range being determined based on a line voltage assumed at the phase when the phase is normal.

According to another aspect of the present invention, there is provided a reclosing system for a power transmission line, which performs high-speed reclosing using protection relays, the protection relays being provided at different terminals of the power transmission line, each of the protection relays comprising a protection calculation function and a reclosing function, the protection calculation function being configured to receive voltage signals detected by a metering voltage transformer and current signals detected by a metering current transformer to execute a predetermined protection calculation to thereby cut off a phase with an accident on the power transmission line, the reclosing function being configured to output a reclosing command to a circuit breaker when the phase with the accident becomes to satisfy a reclosing condition, wherein that each of the protection relays comprises means for sending the reclosing command to the circuit breaker when a line voltage at the phase with the accident, detected by the metering voltage transformer after the phase with the accident is cut off, falls within an allowable range, the allowable range being determined based on a line voltage calculated for the phase assuming that the phase is normal, the calculated line voltage being acquired based on a current and a voltage at a normal phase of the power transmission line.

According to the present invention, it is possible to provide a reclosing system for power transmission lines, which does not require so high line voltage detection accuracy, can easily detect the arc ion extinguishing time of an accident phase, and can prevent occurrence of an accident during reclosing.

BRIEF DESCRIPTION OF THE SEVERAL VIEWS OF THE DRAWING

FIG. 1 is a view illustrating a power system provided with protection relays having a reclosing function, which system is employed in common in first and second embodiments;

FIG. 14 is a flowchart useful in explaining the operation of a sixth embodiment of the present invention;

FIG. 15 is a block diagram illustrating a power system with a reclosing function according to a seventh embodiment of the present invention;

FIG. 16 is a view useful in explaining a phase allowable range set for an induced voltage;

FIG. 19 is a view useful in explaining a conventional power transmission line, (a) of FIG. 19 illustrating a power system as a reclosing target, (b) of FIG. 19 illustrating a breaker operation timing chart useful in explaining a no-voltage time period, and (c) of FIG. 19 illustrating a protection relay operation timing chart; and FIG. 20 is a graph illustrating the relationship between the system voltage and the insulated-state restoring time period.

DETAILED DESCRIPTION OF THE INVENTION

Embodiments of the present invention will be described with reference to the accompanying drawings. In the embodiments, like reference numbers denote like elements, and no duplicate descriptions will be given.

First Embodiment

Figure 2:
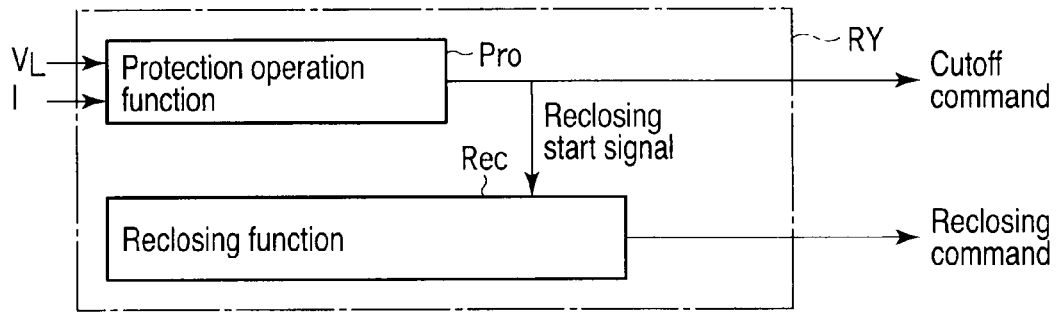
FIG. 2 is a block diagram illustrating each protection relay with the reclosing function, employed in common in the first and second embodiments.
Figure 3:
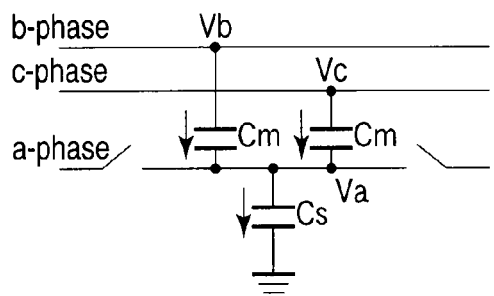
FIG. 3 is a view illustrating a voltage induced during single phase reclosing (a-phase is cut off), (a) of FIG. 3 illustrating a voltage resulting from electrostatic coupling, and (b) of FIG. 3 illustrating a voltage resulting from electromagnetic coupling.
Figure 3:
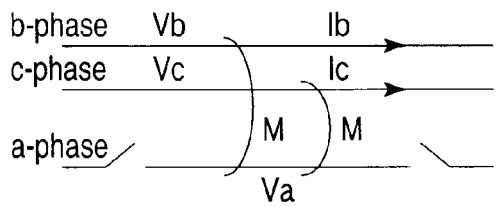

Referring first to FIGS. 1 to 3, a first embodiment of the present invention will be described.

The first embodiment is directed to a reclosing system for power transmission lines, in which a reclosing command is output to an accident-phase cutoff breaker when, for example, adjacent line linkage conditions are met, and when the line voltage of an accident phase assumed after cutoff by the circuit breaker substantially reaches a predetermined value.

(Structure)

FIG. 1 is a view illustrating a power system that includes protection relays RY having a reclosing function and provided at opposing terminals A and B. The reclosing function is used to determine whether reclosing can be executed using only a line voltage signal $V_L$ detected by each metering voltage transformer $VT_L$. FIG. 2 is a block diagram illustrating an example of the protection relay RY having the reclosing function.

At the terminals A and B of the power system shown in FIG. 1, circuit breakers CB-A and CB-B are provided for connecting bus lines BUS-A and BUS-B to power transmission lines TL. Further, metering current transformers CT-A and CT-B are provided on the bus lines BUS-A and BUS-B for detecting line currents i, and metering voltage transformers $VT_L$-A and $VT_L$-B are provided on the power transmission line TL for detecting line voltages $V_L$.

Since the protection relays RY-A and RY-B with the reclosing function have the same structure and function, a description will now be given only of the protection relay RY-A.

As shown in FIG. 2, the protection relay RY-A incorporates a protection calculation function Pro for constantly reading line currents I and line voltages $V_L$ from the current transformers CT-A and the voltage transformers $VT_L$-A, respectively, constantly executing calculations on the read currents I and line voltages $V_L$ using predetermined protection calculation algorithms, and outputting a cutoff command to a circuit breaker CB-A to cut off the place of an accident F when detecting the accident F in the corresponding power transmission line TL as a result of the calculations. The protection relay RY-A also incorporates a reclosing function Rec for outputting a reclosing command to the circuit breaker CB-A when the line voltage of the accident phase measured after the cutoff of the accident place falls within a predetermined allowable range. When the protection operation function Pro operates, it outputs a cutoff command to the circuit breaker CB-A as described above, and also outputs a reclosing start signal to the reclosing function Rec. The protection operation function Pro is, for example, a current differential relay for protection. Further, the reclosing function Rec is also called a reclosing relay.

Returning to FIG. 1, when an accident F occurs in the a-phase power transmission line TL, a cutoff command is output from the protection operation function Pro of the protection relay RY-A to the a-phase breaker, thereby executing cutoff of the a-phase power transmission line TL. At this time, after arc ions are extinguished at the accident place F, the b- and c-phase power transmission lines, which are kept normal, induce a voltage at the a-phase power transmission line that assumes an open state, as will be described referring to FIG. 3.

(a) and (b) of FIG. 3 are views useful in explaining the voltage induced at the a-phase line of a single-line power transmission cable by the normal b- and c-phase lines of the power transmission cable when the a-phase is cut off. More specifically, (a) of FIG. 3 shows an example of electrostatic coupling occurring between the a-phase and the normal b-phase and between the a-phase and the normal c-phase. (b) of FIG. 3 shows an example of electromagnetic induction coupling occurring between the a-phase and the normal b-phase and between the a-phase and the normal c-phase.

Referring first to (a) of FIG. 3, a description will be given of calculation of a voltage induced at the a-phase by the normal b- and c-phases when an accident occurs in the a-phase and hence the a-phase is opened.

Assuming that Cm represents an interphase electrostatic capacitance that occurs between power transmission lines due to electrostatic coupling, and Cs represents an earth electrostatic capacitance, the current given by the following equation (1) flows into the a-phase:

$$j\omega Cm(Vb-Va)+j\omega Cm(Vc-Va)=j\omega CsVa \qquad (1)$$

where jωCm (Vb−Va) represents a current flowing from the b-phase through the interphase capacitance Cm, jωCm (Vc−Va) represents a current flowing from the c-phase through the interphase capacitance Cm. As a result, the current jωCsVa as the synthesized current of jωCm (Vb−Va) and jωCm (Vc−Va) flows through the a-phase to the earth via the earth electrostatic capacitance Cs.

From the equation (1), the voltage sVa expressed by the following equation (2) is derived:

$$sVa = \frac{Cm}{(2Cm+Cs)}(Vb+c) \qquad (2)$$

On the other hand, in (b) of FIG. 3, assuming that the mutual impedance occurring between lines due to electromagnetic coupling is M, the voltage mVa given by the following equation (3) occurs at the a-phase in the open state:

$$mVa = j\omega M(Ib+Ic) \qquad (3)$$

As a result, a voltage (sVa+mVa) obtained by combining the electrostatic coupling voltage sVa and the electromagnetic coupling voltage mVa occurs at the a-phase that is open because of the accident.

Note that in order to avoid complication in drawing and numerical expression, (b) of FIG. 3 does not show Cs, Cm, and M to be associated with a-phase, b-phase, and c-phase although it is desirable to show as such.

The electrostatic coupling voltage sVa shown in FIG. 3 is not associated with the place of an accident, and the following equation (4) is satisfied, which means that the higher the power transmission voltage E and the greater the interline capacitance Cm compared to the ground electrostatic capacitance Cs, the greater the electrostatic coupling voltage sVa.

$$Vc=CmE/(Cs+2Cm) \qquad (4)$$

E: Rated phase voltage of the system

Further, the electromagnetic coupling voltage mVa is induced at the phase that assumes the open state, as is given by the equation (3).

An arc current IC caused by the electromagnetic coupling voltage is given by the following equation (5):

$$Ic=j\omega Cm \cdot L(Vb+Vc) \qquad (5)$$

L: Line length

A voltage Vk is beforehand calculated using the above equation (4), and the currents I and voltages $V_L$, which are respectively introduced from the current transformers CT-A and voltage transformers $VT_L$-A located across the b- and c-phase power transmission lines when the a-phase power transmission line is normal before it is opened because of the accident. The thus-calculated voltage Vk corresponds to the induced voltage (sVa+mVa) and is stored in the memory means of the protection relay RY-A with the reclosing function.

Table 1 shows induced voltages a beforehand calculated by classifying, into three ranks (large, mean and small), the currents flowing through normal lines with one of the lines opened.

TABLE 1

| | Line voltage calculation results | | |
| --- | --- | --- | --- |
| | Current: large | Current: mean | Current: small |
| When a-phase is open | αa 1 | αa 2 | αa 3 |
| When b-phase is open | αb 1 | αb 2 | αb 3 |
| When c-phase is open | αc 1 | αc 2 | αc 3 |

α: Induced voltage at each open phase for each current level

Example of Data Table for Single- or Multi-Line
Power Transmission Cable

In table 1, "Current: large" corresponds to 100% of the rated current of the power transmission line, "Current: mean" corresponds to 50% of the rated current, and "Current: small" corresponds to about 10% of the rated current. In addition to this, data corresponding to various open phases of a double-line transmission cable is prepared.

(First Example of Reclosing Function Rec)

Figure 4:
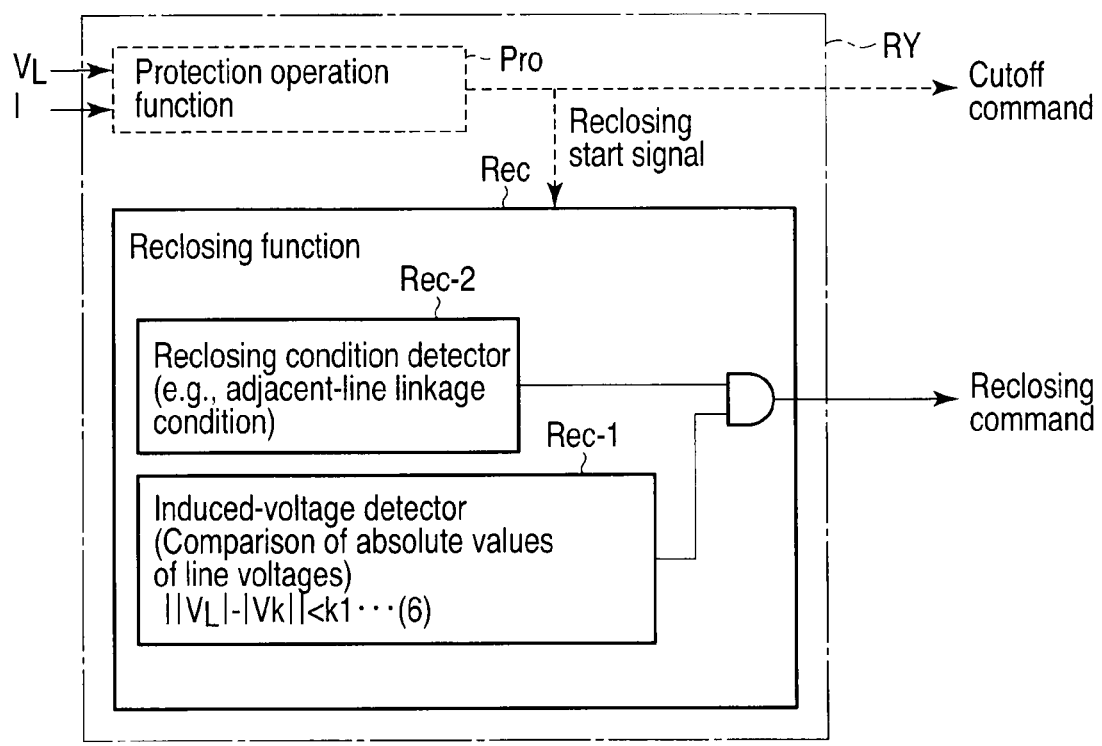
FIG. 4 is a block diagram illustrating an example employed in the first embodiment, in which a line voltage is detected by absolute value comparison.

FIG. 4 shows a structure example of the reclosing function Rec of the protection relay RY. The induced-voltage detector Rec-1 employed in this example executes detection using absolute value comparison.

Namely, the induced-voltage detector Rec-1 having the reclosing function Rec acquires the absolute value ($||V_L|-|V_k||$) of the difference between the absolute value ($|V_L|$) of the measured line voltage $V_L$ induced at, for example, the a-phase opened upon occurrence of an accident, and the absolute value ($|V_k|$) of the line voltage $V_k$ beforehand calculated when the power transmission lines are all normal, and compares the acquired absolute value with an allowance constant k1 beforehand calculated for reclosing (numerical expression (6)). If the calculation result of the induced-voltage detector Rec-1 that the difference with respect to a predetermined value (induced voltage Vk) is determined to fall with a preset range set in view of errors in the measured value, calculated value, the values of the current transformers CT, the voltage transformers $VT_L$, etc., meets the requirements of a reclosing condition detector Rec-2 that a cutoff command is maintained, the adjacent-line linkage conditions are met, etc., a "reclosing command" is sent to the circuit breaker CB.

$$||V_L|-|V_k||<k1 \qquad (6)$$

where $V_L$ represents a line voltage at a phase with an accident, $V_k$ represents an induced voltage beforehand calculated for the phase with the accident, and k1 represents a reclosing allowance constant beforehand calculated based on the currents flowing through the power transmission lines.

For example, if the value of $V_L$ falls within a range of 0.9 Vk to 1.1 Vk (i.e., 0.9 to 1.1 times the value of Vk) based on the reclosing allowance constant k1, it is determined that $V_L$ is substantially equal to Vk, thereby sending a reclosing command to the circuit breaker CB.

The aforementioned predetermined value is a voltage, which is induced by normal phases at a phase opened because of the accident, after arc ions produced at the place of an accident are extinguished.

(Operation)

Figure 5:
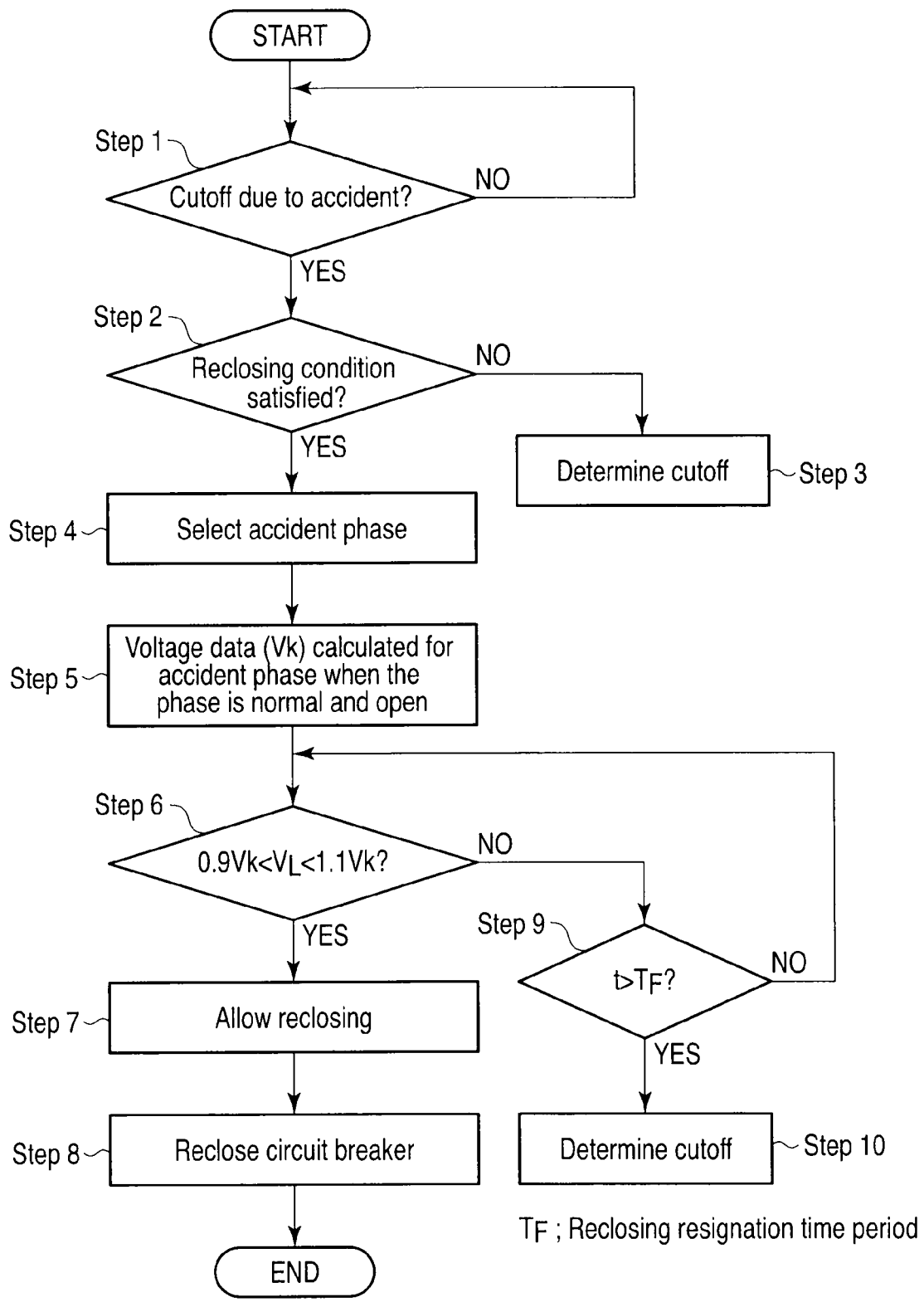
FIG. 5 is a flowchart useful in explaining the operation of the first embodiment.

FIG. 5 is a flowchart useful in explaining the operation of the high-speed reclosing system for power transmission lines according to the first embodiment.

If it is determined at step 1 that an accident occurs in a power transmission line and this transmission line is cut off by the protection relay (Yes at step 1), and it is determined at step 2 that a reclosing condition (associated with the reclosing condition detector Rec-2 of FIG. 4) is not satisfied (No at step 2), it is finally determined at step 3 that cutoff is to be performed.

However, if it is determined at step 2 that the reclosing condition (associated with the reclosing condition detector Rec-2 of FIG. 4) is satisfied (Yes at step 2), a target phase in which the accident has occurred is selected at step 4. At step 5, voltage data Vk indicating the voltage assumed at the target phase when it is normal and open is read from the memory means of the protection relay RY, and at step 6, the read voltage data Vk is compared with the measured line voltage $V_L$.

If it is determined that the measured value $V_L$ falls within the allowable range of 0.9 Vk to 1.1 Vk set in view of errors in the measured value, calculated value, the values of the current transformers CT, the voltage transformers $VT_L$, etc., reclosing is allowed (step 7), and the cut off breaker is reclosed (step 8).

If it is determined that the measured value $V_L$ does not fall within the allowable range of 0.9 Vk to 1.1 Vk (No at step 6), it is determined at step 9 whether an on-delay timer measures a reclosing resignation time period $T_F$. If the time period $T_F$ has elapsed ($t>T_F$), cutoff is finally performed (step 10).

Figure 6:
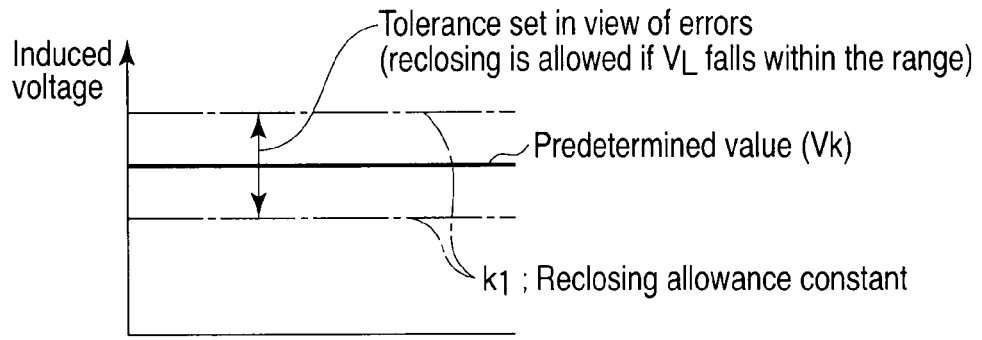
FIG. 6 is a view useful in explaining the concept of a reclosing allowable range employed in the first embodiment.

FIG. 6 is a view illustrating the concept of the reclosing allowable range, i.e., illustrating the relationship between the induced voltage $V_L$ (measured value) employed in the numerical expression (6), the predetermined value Vk, and the predetermined reclosing allowance constant k1.

As is understood from FIG. 6, if the induced voltage $V_L$ measured by the voltage transformer $VT_L$-A is close to the predetermined value Vk, i.e., falls within the upper and lower limits of Vk determined from the upper and lower limits (0.9 and 1.1) of the reclosing allowance constant k1, the numerical expression (6) is satisfied, which means that reclosing is possible.

(Second Example of Reclosing Function Rec)

Figure 7:
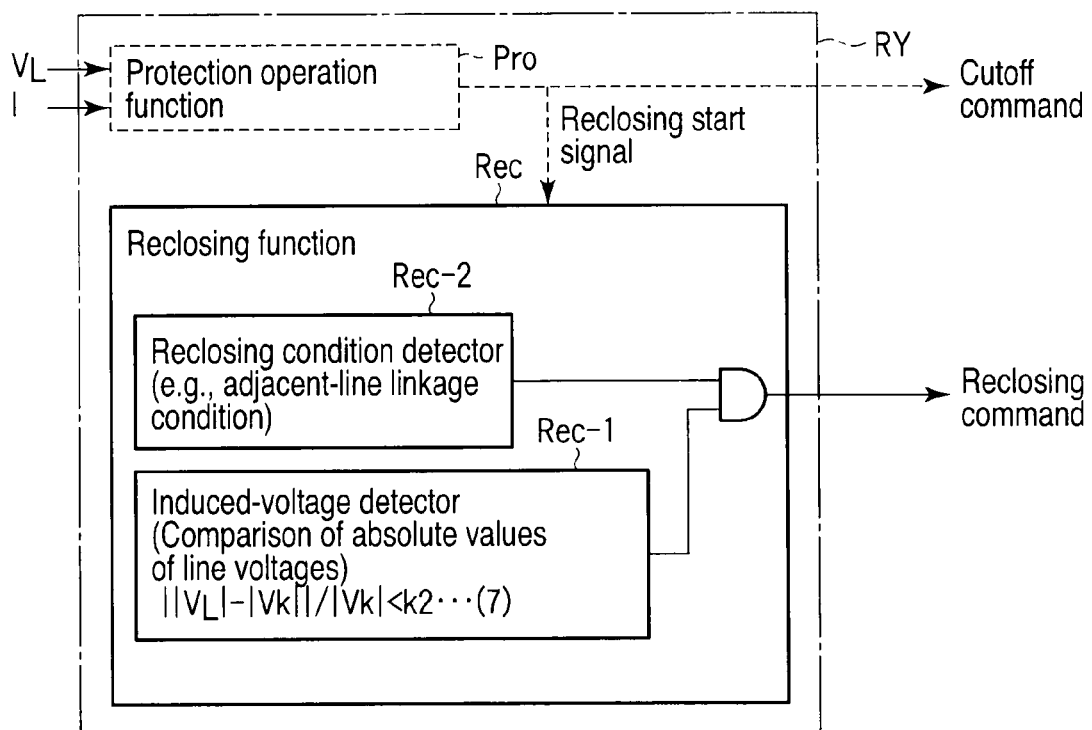
FIG. 7 is a block diagram illustrating another example employed in the first embodiment, in which a line voltage is detected using a ratio.

FIG. 7 shows a second example of the induced-voltage detector Rec-1 of the reclosing function Rec.

In the first example of the induced-voltage detector Rec-1, if 0.9 Vk<$V_L$<1.1 Vk, a reclosing command is issued. In contrast, in the second example of the induced-voltage detector Rec-1, if the ratio of the absolute value of the difference between the absolute value of the measured line voltage $V_L$ and the absolute value of the calculated line voltage $V_k$, to the absolute value of the calculated value $V_k$ is lower than a predetermined value k2, as is shown in the following expression (7), reclosing is executed.

$$||V_L|-|V_k||/|V_k|<k2 \qquad (7)$$

where $V_L$ represents a line voltage at a phase with an accident, $V_k$ represents an induced voltage beforehand calculated for the phase with the accident, and k2 represents a reclosing allowable ratio beforehand calculated based on the currents flowing through the power transmission lines.

(Advantage)

As described above, in the first embodiment of the present invention, a voltage induced by a normal phase is beforehand detected, and stored as a predetermined value Vk in the protection relay with the reclosing function, and an induced voltage $V_L$ measured upon occurrence of an accident is compared with the stored value Vk. As a result, it can be easily determined whether reclosing should be executed. This system can also be employed in a reclosing-dedicated apparatus.

Second Embodiment

A second embodiment of the present invention will be described.

(Structure)

The second embodiment differs from the first embodiment as follows: In the first embodiment, an induced voltage is beforehand calculated. In contrast, in the second embodiment, the induced voltage $V_L$ measured at a phase with an accident is compared with the induced voltage Vk calculated, using the current and voltage read from the current transformer CT and voltage transformer $VT_L$ corresponding to a normal phase after cutoff is executed upon the occurrence of the accident, and assuming that arc ions at the accident phase has been extinguished. If both values are close to each other, a reclosing command is sent to the circuit breaker corresponding to the accident phase.

Since the structures of the protection relay RY and the reclosing function Rec therein are similar to those of the first embodiment shown in FIGS. 1, 2, 4 and 7, no detailed description is given thereof. Similarly, since the above-mentioned predetermined value (approximate value) is described in the first embodiment, it is not described again.

(Operation)

Figure 8:
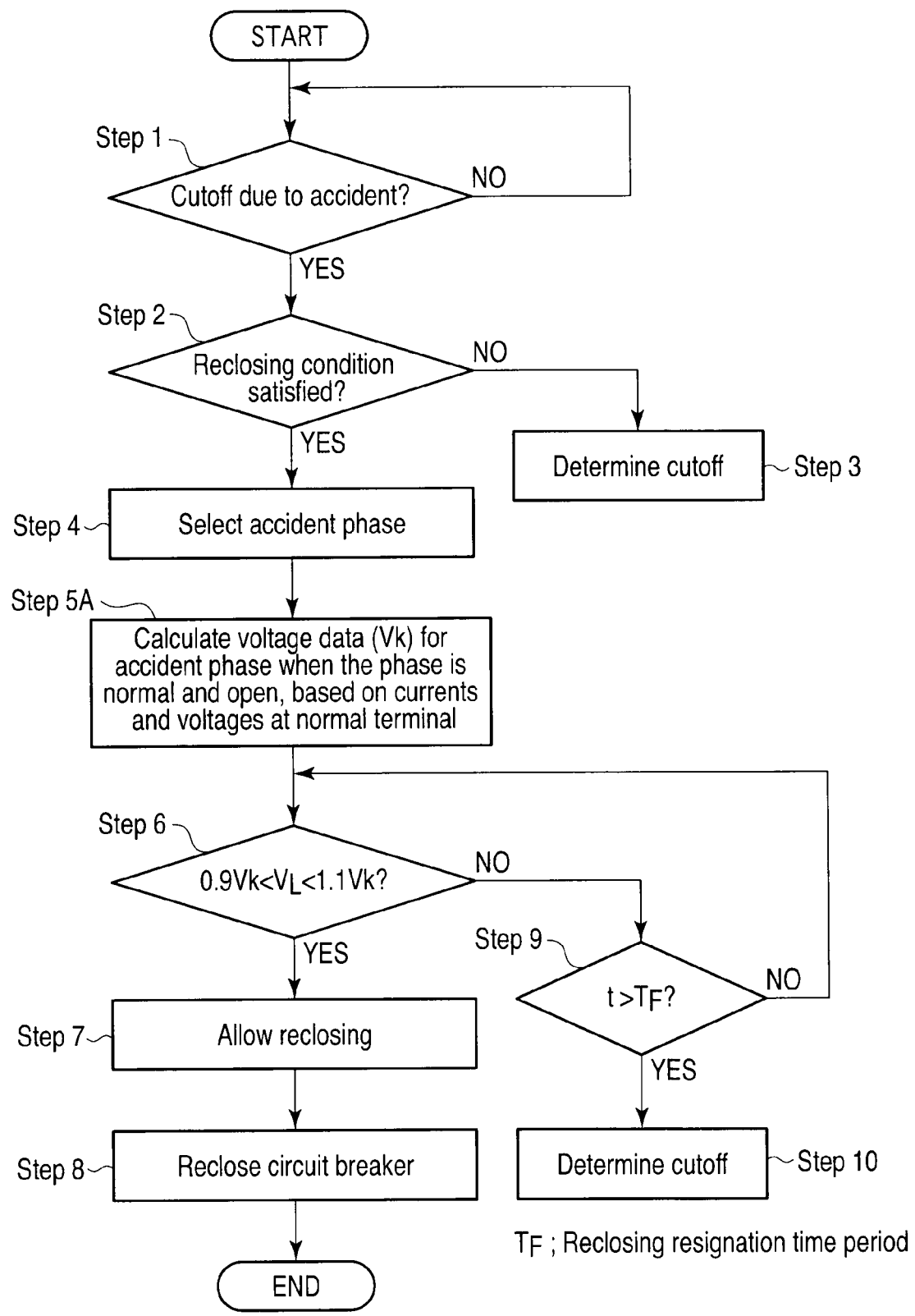
FIG. 8 is a flowchart useful in explaining the operation of a second embodiment.

FIG. 8 is a flowchart useful in explaining the operation of the high-speed reclosing system for power transmission lines according to the second embodiment.

The flowchart of FIG. 8 differs from that of FIG. 5 in that in the former, step 5 in FIG. 5 is replaced with step 5A. Namely, at step 5A subsequent to the accident phase selection of step 4, the voltage (Vk) assumed at an accident phase if this phase is normal and open is calculated based on the terminal current and voltage of the other normal phases. The other calculation operations in the second embodiment are similar to those described above, and are therefore not described.

(Advantage)

As described above, in the second embodiment of the present invention, whether reclosing should be executed can be determined simply by confirming whether the line voltage $V_L$ measured at the accident phase after cutoff is executed is close to the induced voltage (Vk) calculated by the protection relay with the reclosing function based on the voltages induced by the normal phases.

Third Embodiment

A third embodiment of the present invention will be described.

Figure 9:
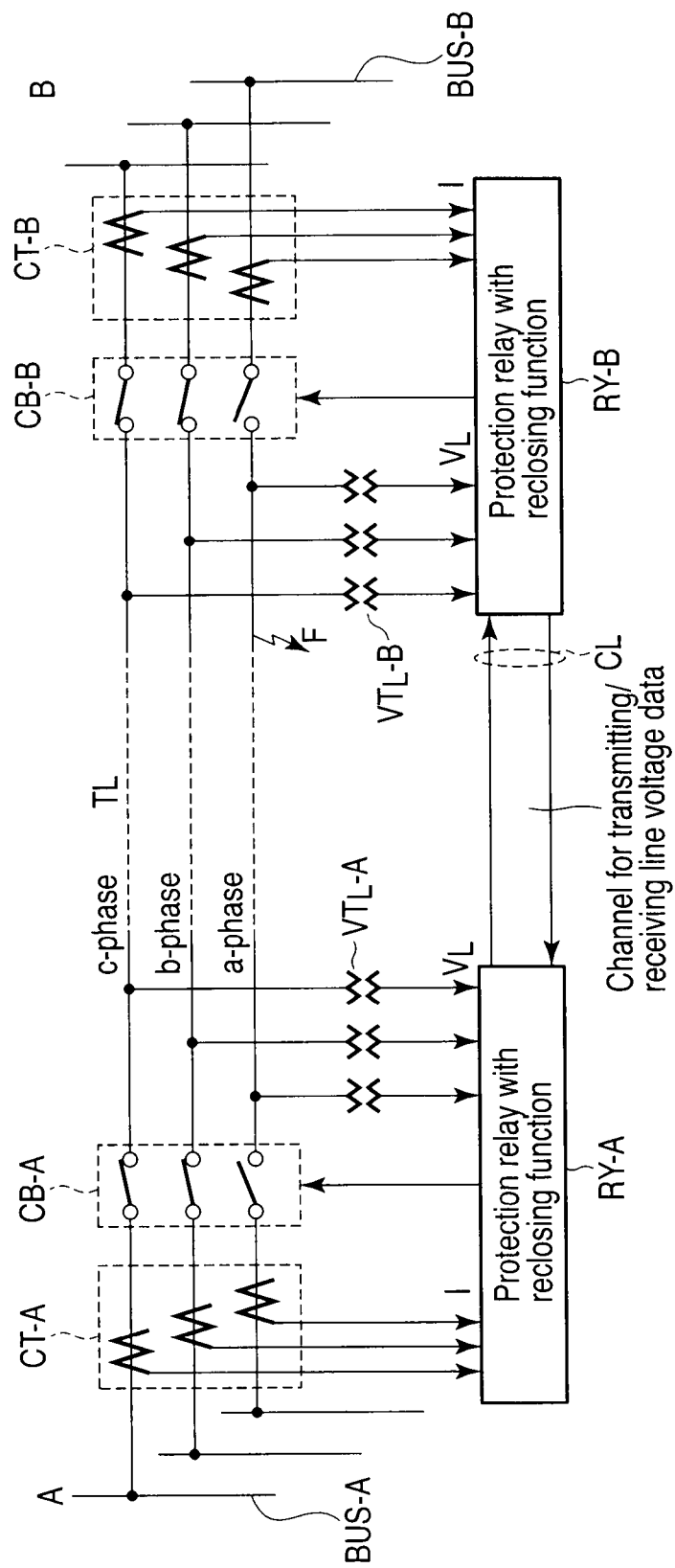
FIG. 9 is a circuit diagram illustrating a power system with a reclosing function shared between third to fifth embodiments of the present invention.
Figure 10:
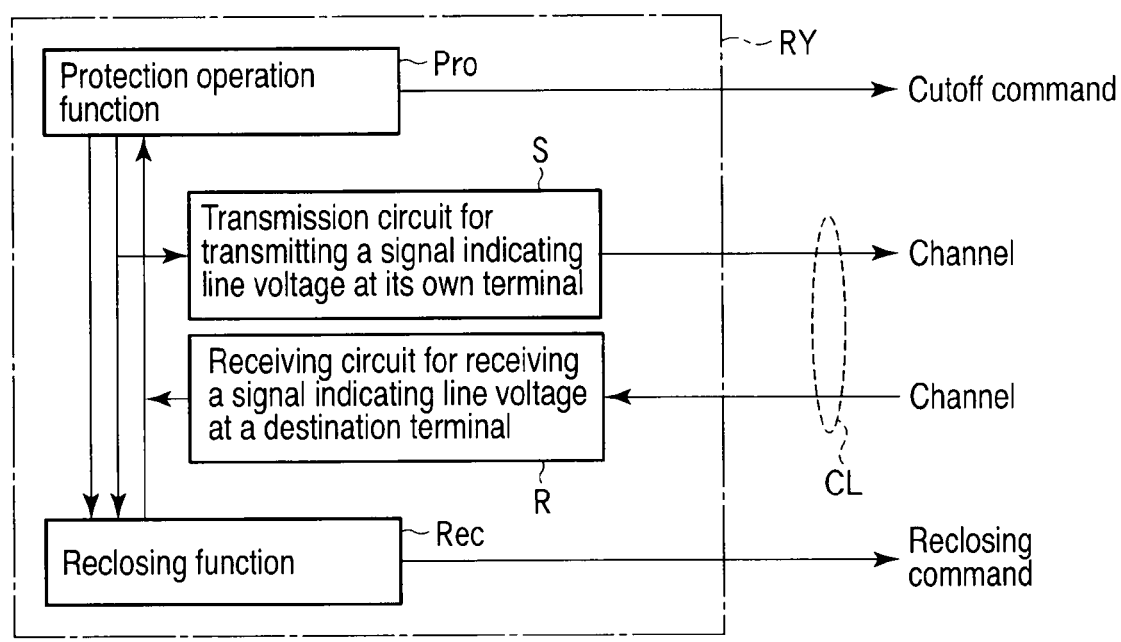
FIG. 10 is a block diagram illustrating the power system with the reclosing function shared between the third to sixth embodiments of the present invention.

FIG. 9 illustrates a power system that incorporates protection relays RY having a reclosing function according to the third embodiment, and FIG. 10 illustrates an example of each protection relay RY of the third embodiment.

(Structure)

As shown in FIGS. 9 and 10, each of the protection relays RY with the respective reclosing functions according to the third embodiment is obtained by adding, to each protection relay RY with the reclosing function shown in FIGS. 1 and 2, transmission means S for transmitting, to a destination terminal (terminal B), a signal indicating the line voltage $V_L$ detected by a metering voltage transformer $VT_L$ provided at a terminal (terminal A) opposing the destination terminal, and receiving means R for receiving a line voltage $V_L$ signal sent from the destination terminal, and also adding, to the reclosing function Rec, means for determining whether reclosing should be executed, using those line voltage signals $V_L$. CL denotes a channel connecting the terminals to each other.

(Operation)

The protection relays mutually transmit and receive, via the channel CL, data indicating the line voltage $V_L$ detected at the respective terminals (A and B).

The line voltage of an accident phase sent from the terminal A and the destination terminal B is compared with a predetermined value (used for determining whether reclosing is allowable) stored in the protection relay RY with the reclosing function. If the former voltage is close to the predetermined value, a reclosing command is output to the corresponding circuit breakers of both terminals.

Figure 11:
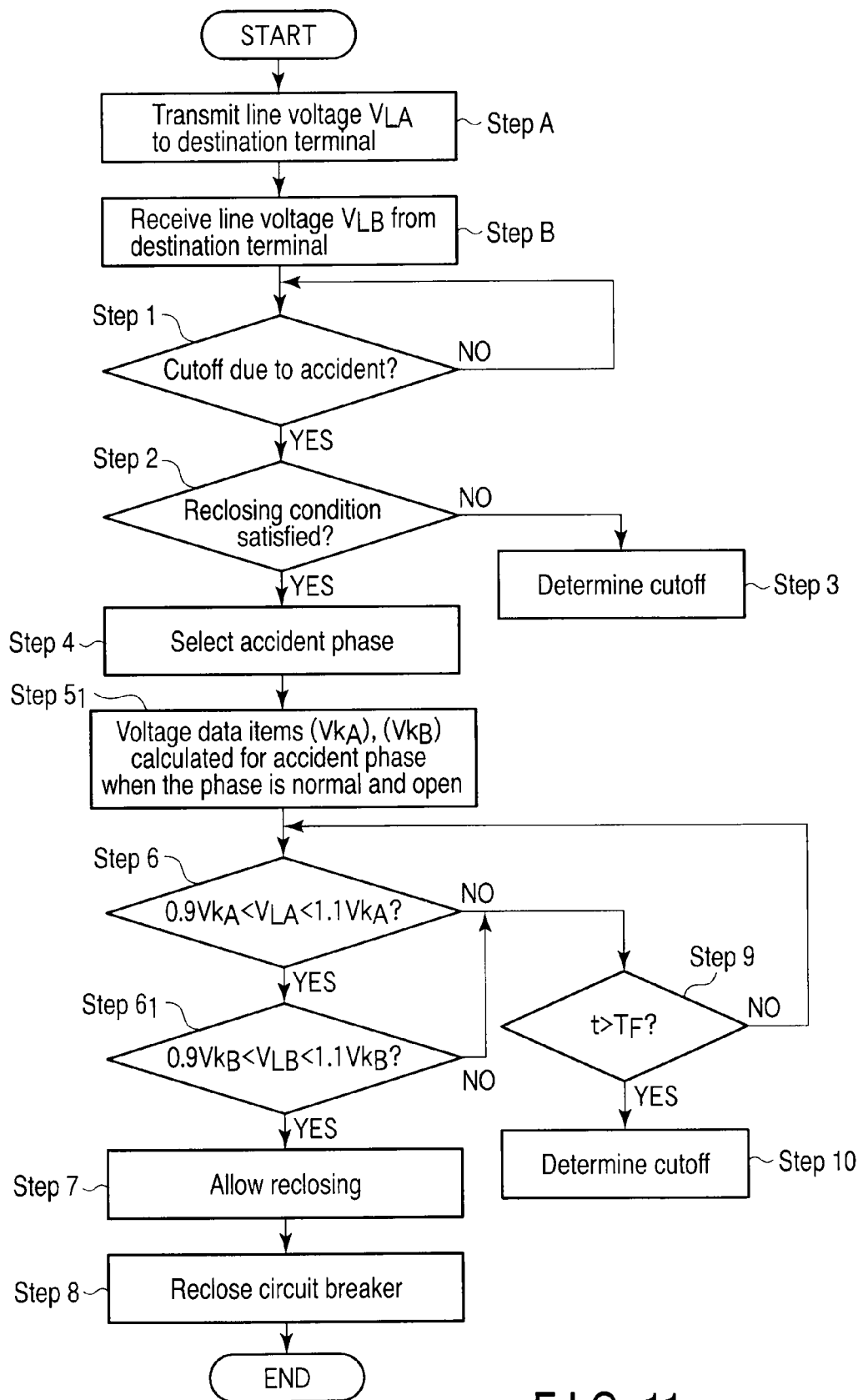
FIG. 11 is a flowchart useful in explaining the operation of a third embodiment of the present invention.

FIG. 11 is a flowchart useful in explaining the operation of the high-speed reclosing system for power transmission lines according to the second embodiment.

The flowchart of FIG. 11 differs from that of FIG. 5 in that in the former, before the terminals A and B each determine at step 1 whether cutoff is made due to an accident, step A of mutually transmitting line voltages to the terminals A and B, and step B of mutually receiving the transmitted line voltages by the terminals A and B are subsequently executed, and steps $5_1$, 6 and $6_1$ are executed in place of steps 5 and 6. At steps $5_1$, 6 and $6_1$, the received line voltage data $V_{LA}$ and $V_{LB}$ is compared with voltages $Vk_A$ and $Vk_B$, respectively, which are obtained if a current accident phase is normal and open, and are beforehand stored in the protection relays. The other processes are similar to those of FIG. 5.

$V_{LA}$ indicates line voltage data transmitted from the terminal A, $V_{LB}$ indicates line voltage data received by the terminal A, $Vk_A$ indicates the line voltage calculated at the terminal A at step $5_1$ and corresponding to the voltage induced at a phase when an accident has occurred at the phase and therefore the phase is opened, and $Vk_B$ indicates the line voltage calculated at the terminal B at step $5_1$ and corresponding to the induced voltage.

At step 6, for the terminal A, the numerical expression for allowing reclosing is set to $0.9\,Vk_A < V_{LA} < 1.1\,Vk_A$. Similarly, at step $6_1$, for the terminal B, the numerical expression for allowing reclosing is set to $0.9\,Vk_B < V_{LB} < 1.1\,Vk_B$. When both expressions are satisfied, reclosing is permitted to reclose the circuit breaker corresponding to the accident phase.

(Advantage)

In the third embodiment, the line voltages $V_L$ detected at both terminals A and B are mutually transmitted and received, and both terminal data is used, which enables a single determination level to be set at both terminals. Thus, the reliability of the determination as to whether reclosing should be executed is enhanced.

Fourth Embodiment

A fourth embodiment of the present invention will be described.

(Structure)

Each of protection relays RY having a reclosing function, according to the fourth embodiment, comprises means for transmitting and receiving line voltages to and from a facing terminal, and functions to send a reclosing command to an accident phase when the line voltage, measured at the opposite ends of a phase with an accident after cutoff is made due to the occurrence of the accident, is close to the line voltage calculated for the accident phase based on the currents and voltages at the other normal phases, assuming that the accident phase is normal. Since the structure of the protection relay RY with the reclosing function according to the fourth embodiment is similar to that of the third embodiment shown in FIGS. 9 and 10, no description is given thereof.

(Operation)

In the fourth embodiment, line voltage $V_L$ data obtained at facing terminals is transmitted to the respective protection relays RY each having the reclosing function. The protection relays RY at both terminals each calculate a voltage induced by the normal phases, and compare the calculated value with the line voltage $V_L$ of the accident phase. If the calculated values obtained at both terminals are each close to the line voltage $V_L$, a reclosing command is sent to the accident phase.

Figure 12:
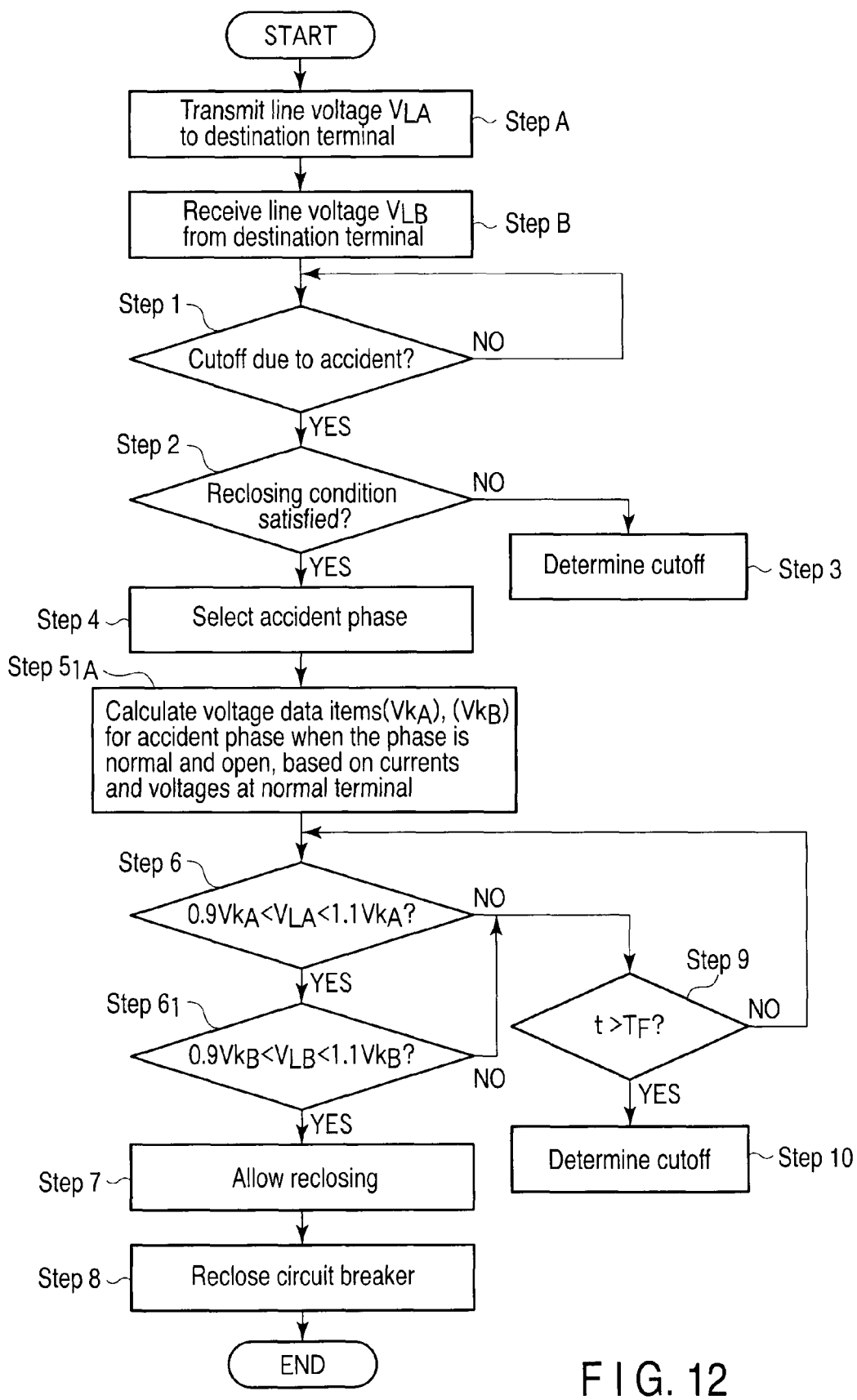
FIG. 12 is a flowchart useful in explaining the operation of a fourth embodiment of the present invention.

FIG. 12 is a flowchart useful in explaining the operation of the fourth embodiment.

The fourth embodiment differs from the third embodiment in that at step $5_{1A}$ in the former, both $Vk_A$ of one terminal and $Vk_B$ of the other terminal are used for calculating the line voltage that may well occur at the accident phase assuming that this phase is normal and open. The other processes are similar to those of the flowchart of FIG. 11, and hence no description is given thereof.

(Advantage)

In the fourth embodiment, $V_L$ data obtained at both terminals are mutually transmitted to and received from each other, and it is confirmed at both terminals whether the data is close to the line voltage calculated for an accident phase based on the currents and voltages at the other normal phases, assuming that the accident phase is normal. This enables the same determination level to be employed at both terminals, thereby enhancing the reliability of determination as to whether reclosing should be executed.

Fifth Embodiment

A fifth embodiment of the present invention will be described.

(Structure)

The fifth embodiment is characterized in that a condition for starting reclosing is used as a condition for transmitting line voltage data in the third or fourth embodiment. Since the structure of a protection relay RY with a reclosing function according to the fifth embodiment is similar to that of the third embodiment shown in FIGS. 9 and 10, no description is given thereof.

(Operation)

Figure 13:
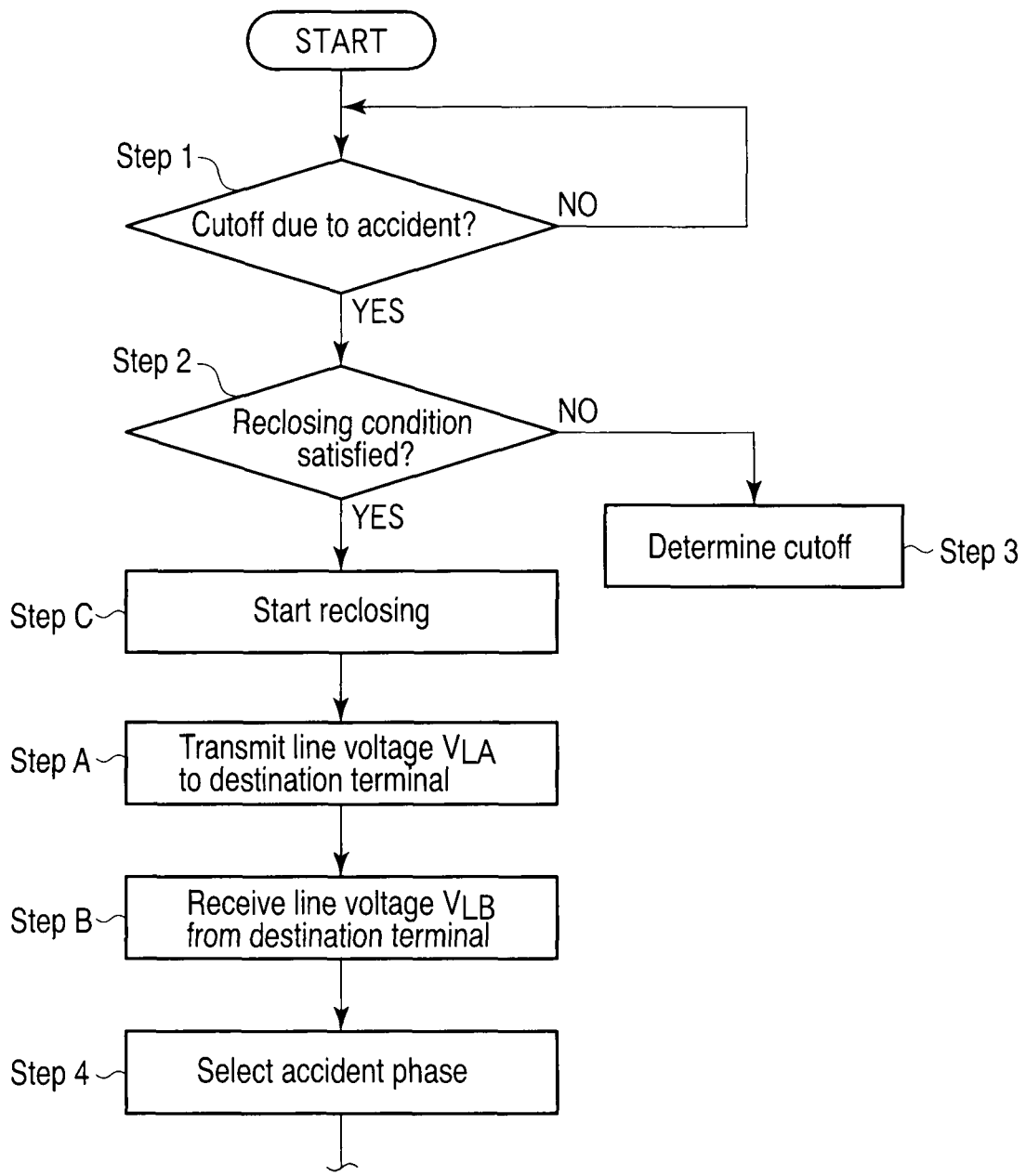
FIG. 13 is a flowchart useful in explaining the operation of a fifth embodiment of the present invention.

The fifth embodiment differs from the third and fourth embodiments as follows: In the third and fourth embodiments, line voltage data obtained at respective terminals is always transmitted and received. In contrast, in the fifth embodiment, as shown in the flowchart of FIG. 13, step C for staring reclosing is interposed between step 2 for determining whether a condition for reclosing is satisfied, and step A for transmitting line voltage $V_{LA}$ to a facing terminal. Since the processes after step 4 are similar to those of the flowchart shown in, for example, FIG. 12, no illustration and no description are given thereof.

When line voltage data is transmitted using the condition for starting reclosing as in the fifth embodiment, the data can be transmitted using an area for current data that is not used during reclosing.

(Advantage)

Since voltage data is not always transmitted, the number of calculations performed in the protection relay RY with the reclosing function can be reduced, and a transmission line in which the amount of transmission is limited can be utilized.

Sixth Embodiment

A sixth embodiment of the present invention will be described.

(Structure)

The sixth embodiment is obtained by modifying the first to fifth embodiments such that if the line voltage assumed at a phase with an accident after cutoff is made upon occurrence of the accident is not close to the aforementioned predetermined value, a reclosing command is sent to the accident phase when a predetermined time period elapses after the accident.

Since the structures of a protection relay RY and a reclosing function Rec in the relay RY, according to the sixth embodiment, are similar to those of the first embodiment shown in FIGS. 1, 2, 4 and 7, and to the third embodiment shown in FIGS. 9 and 10, no description is given thereof.

(Operation)

FIG. 14 is a flowchart useful in explaining the operation of the sixth embodiment.

At step 6 of the sixth embodiment, if the line voltage $V_L$ assumed at a phase with an accident after cutoff is made upon occurrence of the accident is not close to the aforementioned predetermined value Vk (No at step 6), the process proceeds to step 9 where it is determined whether a predetermined time period (Tm: no-voltage time period) elapses after the accident. If it is determined that the predetermined time period has elapsed, the process skips over step 7 to step 8, where a circuit breaker CB corresponding to the accident phase is reclosed. A no-voltage period timer is started upon the reclosing of the circuit breaker CB. During the no-voltage time period, it is detected whether the line voltage is close to the predetermined value, and if it is not close to the value, a reclosing command is sent to the circuit breaker CB corresponding to the accident phase after the predetermined time period elapses.

(Advantage)

To enable reclosing even if the line voltage is not close to the predetermined value, a reclosing system using a conventional no-voltage period count timer is also employed, thereby providing a backup effect.

Seventh Embodiment

A seventh embodiment of the present invention will be described.

(Structure)

The seventh embodiment is obtained by modifying the first to fifth embodiments such that if the phase difference (θ) between the voltage assumed at an accident phase after cutoff is made, and the voltage at each normal phase is close to a predetermined value, a reclosing command is sent to the accident phase.

FIG. 15 shows the structure of a protection relay RY with a reclosing function according to the seventh embodiment. The structure shown in FIG. 15 is obtained by replacing the induced voltage detector Rec-1 employed in the structure of the first embodiment shown in FIG. 4 or 7, with an allowable range detector Rec-3 for detecting whether a phase difference between the measured voltage value $V_L$ and the calculated value Vk of the line voltage. Since the other structures of the seventh embodiment are similar to those of the first embodiment, no detailed description is given thereof.

FIG. 16 is a view useful in explaining the induced voltage and the allowable range in phase difference, Vk and $V_L$ indicating the levels and phases of the measured and calculated voltages.

(Operation)

The seventh embodiment differs from the first through fifth embodiments in that in the former, the voltage and the phase thereof induced at an accident phase by normal phases are of a three-phase AC voltage. In this embodiment, a database concerning the relationship between predetermined voltages and phases is prestored in the protection relay with the reclosing function. The line voltage assumed at a phase with an accident after cutoff is made upon occurrence of the accident is compared with a predetermined value beforehand associated with the voltage. If it is determined as a result of comparison that they are close to each other, a reclosing command is sent to the accident phase.

Figure 17:
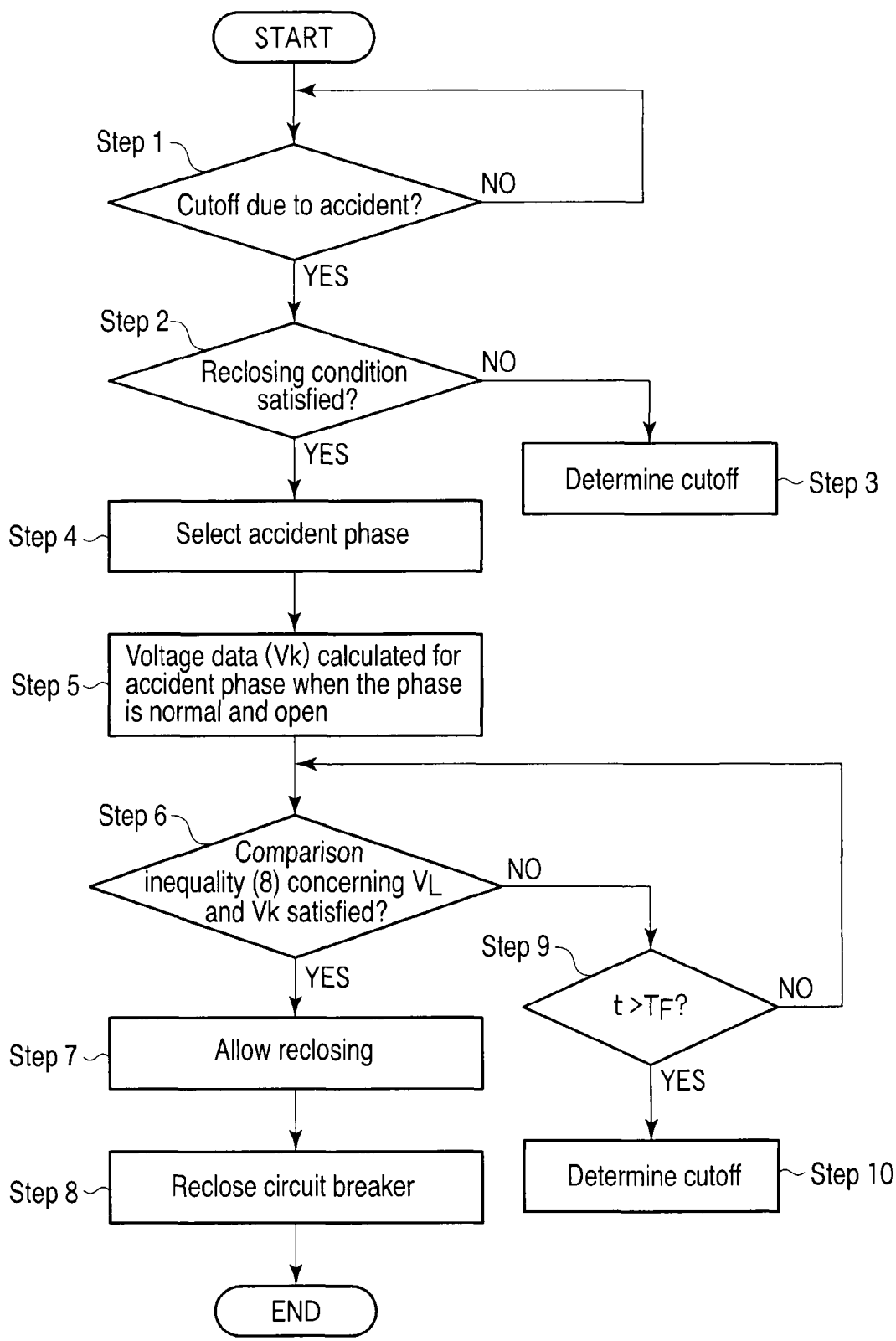
FIG. 17 is a flowchart useful in explaining the operation of the seventh embodiment of the present invention.

FIG. 17 is a flowchart illustrating the operation of the seventh embodiment.

At step 6, the line voltage Vk to be detected at an accident phase if this phase is normal is compared with the measured line voltage $V_L$, and if it falls within predetermined voltage and phase ranges associated with the phase as given by the following numerical expression (8), reclosing is allowed to reclose the corresponding circuit breaker:

$$0.9Vk < V_L < 1.1Vk \quad (8)$$

$$(V_L \char`\^ Vk \leq \theta)$$

(Advantage)

The voltage and phase induced at the accident phase can easily be detected since a three-phase AC voltage is applied, thereby enhancing the reliability of the reclosing execution determination.

Eighth Embodiment

An eighth embodiment of the present invention will be described.

(Structure)

The eighth embodiment is obtained by modifying the three to fifth embodiments and the seventh embodiment such that when a terminal determines that reclosing is allowable, the determination result is sent to the other terminal, and only if both terminals determine that reclosing is allowable, reclosing is executed. Since the structures of the protection relay RY and the reclosing function Rec in the eighth embodiment are similar to those of the first embodiment shown in FIGS. 1, 2, 4 and 7, and those of the third embodiment shown in FIGS. 9 and 10, no detailed description is given thereof.

(Operation)

The eighth embodiment differs from the three to fifth embodiments and the seventh embodiment in that in the former, when a terminal determines that reclosing is allowable, the determination result is sent to the other terminal, and only if both terminals determine that reclosing is allowable, reclosing is executed.

Figure 18:
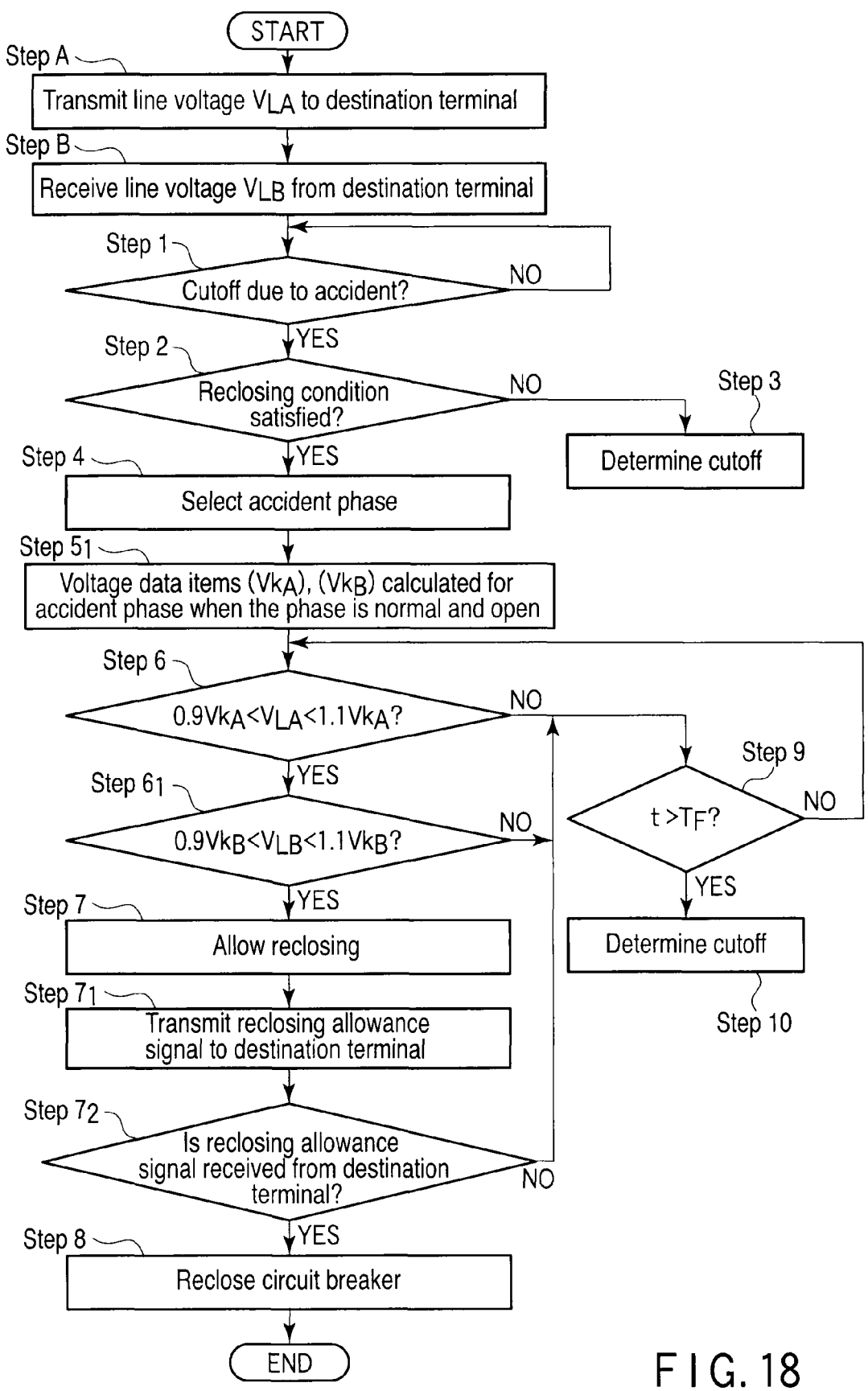
FIG. 18 is a flowchart useful in explaining the operation of an eighth embodiment of the present invention.

FIG. 18 is a flowchart useful in explaining the operation of the eight embodiment.

In the eighth embodiment, step 71 for transmitting a reclosing allowance command from a certain terminal to an opposing terminal, and step 72 for receiving a reclosing allowance command from the opposing terminal are provided after the step 7 explained with reference to the flowcharts of FIGS. 11 and 12. If the answer to the step 72 is No, an on-delay timer $T_F$ for measuring a no-voltage time period is started at step 9, and only when reclosing conditions are satisfied at both terminals, reclosing is allowed to reclose a corresponding circuit breaker.

(Advantage)

In the eighth embodiment, since reclosing allowance signals are mutually transmitted and received by both terminals, both terminals can simultaneously reclose the corresponding circuit breaker. If a reclosing allowable signal cannot be received from the opposing terminal, cutoff is made after a predetermined time period elapses. Since thus, reclosing is allowed only when reclosing conditions are satisfied at both terminals, the reliability of the determination as to whether reclosing should be executed is further enhanced.

As described above in detail, according to the present invention, it is possible to provide a reclosing system for power transmission lines, which can easily detect the extinguishing time of arc ions in an accident phase, and hence can prevent occurrence of an accident during reclosing.

What is claimed is:

1. A reclosing system for a power transmission line, which performs high-speed reclosing using protection relays, the protection relays being provided at different terminals of the power transmission line, each of the protection relays comprising a protection calculation function and a reclosing function, the protection calculation function being configured to receive voltage signals detected by a metering voltage transformer and current signals detected by a metering current transformer to execute a predetermined protection calculation to thereby cut off a phase with an accident on the power transmission line, the reclosing function being configured to output a reclosing command to a circuit breaker when the phase with the accident becomes to satisfy a reclosing condition, wherein each of the protection relays comprises means for sending the reclosing command to the circuit breaker when a line voltage at the phase with the accident, detected by the metering voltage transformer after the phase with the accident is cut off, falls within an allowable range, the allowable range being determined based on a line voltage assumed at the phase when the phase is normal.

2. The reclosing system according to claim 1, wherein each of the protection relays comprises transmission means provided at one terminal for transmitting a line voltage to another terminal, and receiving means provided at the terminal for receiving a line voltage from said another terminal, and a reclosing command is sent to the circuit breaker when both line voltage data items related to the phase with the accident and held at the terminals of the power transmission line fall within a predetermined allowable range.

3. The reclosing system according to claim 1, wherein each of the protection relays comprises transmission means provided at one terminal for transmitting a line voltage to another terminal, and receiving means provided at said one terminal for receiving a line voltage from said another terminal, and a reclosing command is sent to the circuit breaker when both line voltage data items, which are related to the phase with the accident, acquired after the phase is cut off, and held at the terminals of the power transmission line, indicates a line voltage close to a line voltage calculated for the phase assuming that the phase is normal, the calculated line voltage being acquired based on a current and a voltage at a normal phase of the power transmission line.

4. The reclosing system according to claim 2, wherein the line voltage data items are transmitted based on a condition for starting reclosing.

5. The reclosing system according to claim 1, wherein when the line voltage assumed at the phase with the accident after the phase is cut off does not fall with the predetermined allowable range, the reclosing command is sent to the circuit breaker after a predetermined time period elapses.

6. The reclosing system according to claim 1, wherein when a line voltage and a phase thereof measured at the phase with the accident after the phase is cut off is close to a predetermined value, the reclosing command is sent to the circuit breaker.

7. The reclosing system according to claim 2, wherein when it is determined at one terminal that reclosing is allowable, data indicating that reclosing is allowable is sent to another terminal, and only if the data indicates that a condition set at said one terminal for allowing the reclosing coincides with a condition set at said another terminal for allowing the reclosing, reclosing is executed.

8. The reclosing system according to claim 1, wherein the allowable range is $||V_L|-|V_k||<k1$ where $V_L$ represents the line voltage at the phase with the accident and falls within a range of 0.9 Vk to 1.1 Vk, $V_k$ represents an induced voltage beforehand calculated for the phase with the accident, the induced voltage being induced by a normal phase of the power transmission line, and k1 represents a reclosing allowance constant beforehand calculated based on currents flowing through the power transmission line.

9. The reclosing system according to claim 1, wherein the allowable range is $||V_L|-|V_k||/|V_k|<k2$ where $V_L$ represents the line voltage at the phase with the accident and falls within a range of 0.9 Vk to 1.1 Vk, $V_k$ represents an induced voltage beforehand calculated for the phase with the accident, the induced voltage being induced by a normal phase of the power transmission line, and k2 represents a reclosing allowable ratio beforehand calculated based on currents flowing through the power transmission line.

10. A reclosing system for a power transmission line, which performs high-speed reclosing using protection relays, the protection relays being provided at different terminals of the power transmission line, each of the protection relays comprising a protection calculation function and a reclosing function, the protection calculation function being configured to receive voltage signals detected by a metering voltage transformer and current signals detected by a metering current transformer to execute a predetermined protection calculation to thereby cut off a phase with an accident on the power transmission line, the reclosing function being configured to output a reclosing command to a circuit breaker when the phase with the accident becomes to satisfy a reclosing condition,
wherein each of the protection relays comprises means for sending the reclosing command to the circuit breaker when a line voltage at the phase with the accident, detected by the metering voltage transformer after the phase with the accident is cut off, falls within an allowable range, the allowable range being determined based on a line voltage calculated for the phase assuming that the phase is normal, the calculated line voltage being acquired based on a current and a voltage at a normal phase of the power transmission line.

11. The reclosing system according to claim 10, wherein each of the protection relays comprises transmission means provided at one terminal for transmitting a line voltage to another terminal, and receiving means provided at the terminal for receiving a line voltage from said another terminal, and
a reclosing command is sent to the circuit breaker when both line voltage data items related to the phase with the accident and held at the terminals of the power transmission line fall within a predetermined allowable range.

12. The reclosing system according to claim 10, wherein each of the protection relays comprises transmission means provided at one terminal for transmitting a line voltage to another terminal, and receiving means provided at said one terminal for receiving a line voltage from said another terminal, and
a reclosing command is sent to the circuit breaker when both line voltage data items, which are related to the phase with the accident, acquired after the phase is cut off, and held at the terminals of the power transmission line, indicates a line voltage close to a line voltage calculated for the phase assuming that the phase is normal, the calculated line voltage being acquired based on a current and a voltage at a normal phase of the power transmission line.

13. The reclosing system according to claim 11, wherein the line voltage data items are transmitted based on a condition for starting reclosing.

14. The reclosing system according to claim 10, wherein when the line voltage assumed at the phase with the accident after the phase is cut off does not fall with the predetermined allowable range, the reclosing command is sent to the circuit breaker after a predetermined time period elapses.

15. The reclosing system according to claim 10, wherein when a line voltage and a phase thereof measured at the phase with the accident after the phase is cut off is close to a predetermined value, the reclosing command is sent to the circuit breaker.

16. The reclosing system according to claim 11, wherein when it is determined at one terminal that reclosing is allowable, data indicating that reclosing is allowable is sent to another terminal, and only if the data indicates that a condition set at said one terminal for allowing the reclosing coincides with a condition set at said another terminal for allowing the reclosing, reclosing is executed.

17. The reclosing system according to claim 10, wherein the allowable range is $||V_L|-|V_k||<k1$ where $V_L$ represents the line voltage at the phase with the accident and falls within a range of 0.9 Vk to 1.1 Vk, $V_k$ represents an induced voltage beforehand calculated for the phase with the accident, the induced voltage being induced by a normal phase of the power transmission line, and k1 represents a reclosing allowance constant beforehand calculated based on currents flowing through the power transmission line.

18. The reclosing system according to claim 10, wherein the allowable range is $||V_L|-|V_k||/|V_k|<k2$ where $V_L$ represents the line voltage at the phase with the accident and falls within a range of 0.9 Vk to 1.1 Vk, $V_k$ represents an induced voltage beforehand calculated for the phase with the accident, the induced voltage being induced by a normal phase of the power transmission line, and k2 represents a reclosing allowable ratio beforehand calculated based on currents flowing through the power transmission line.

* * * * *